May 31, 1927.  1,630,294
E. B. FOOTE
PROCESS CONTROL APPARATUS
Filed March 5, 1924  3 Sheets-Sheet 1
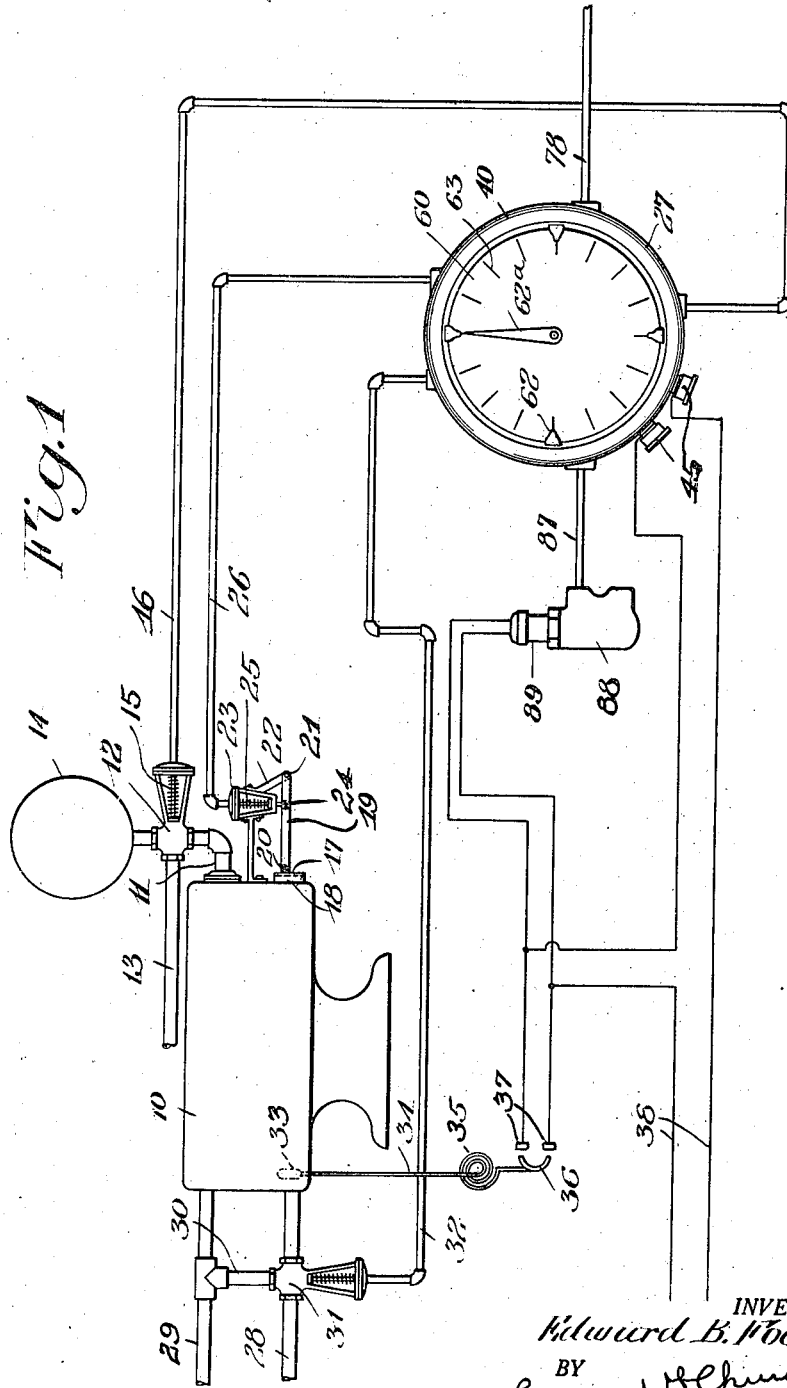

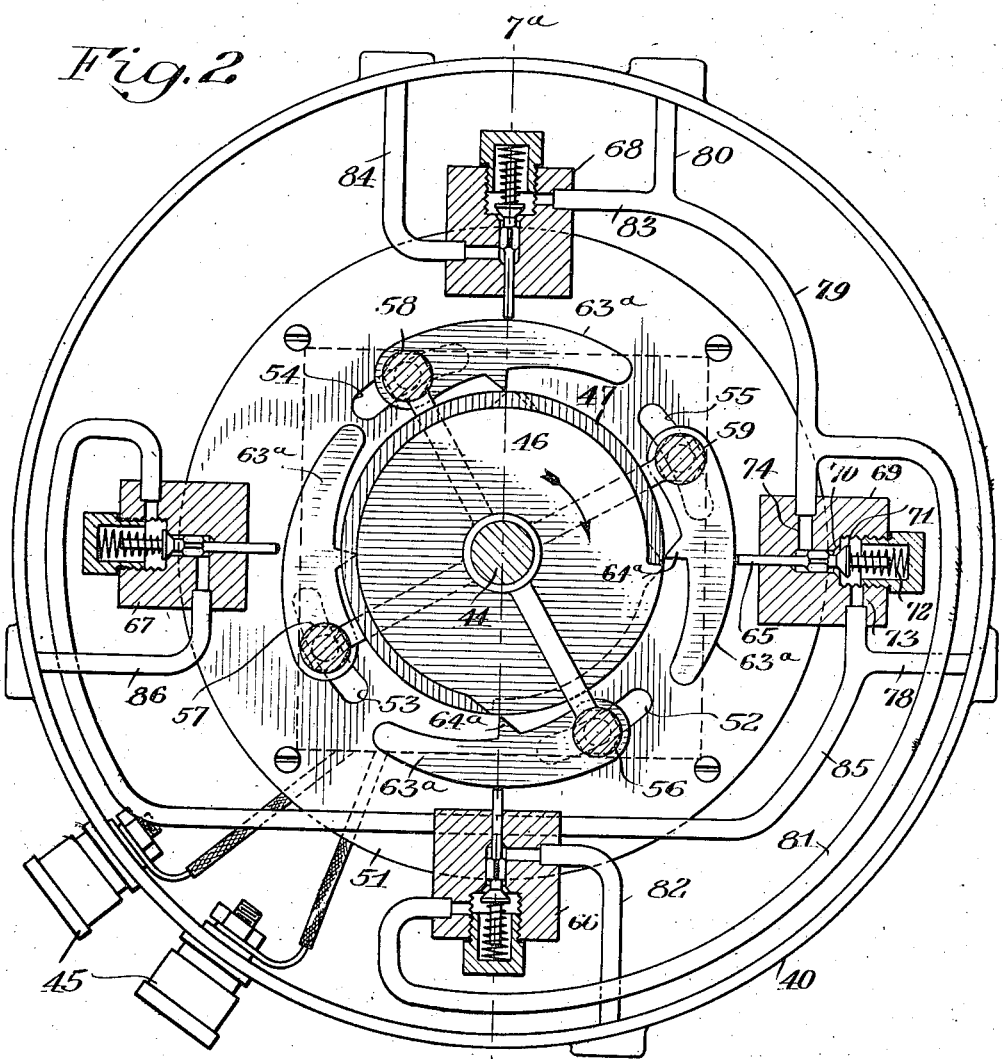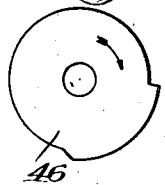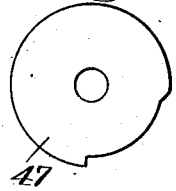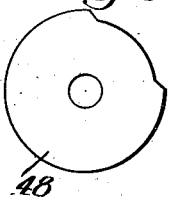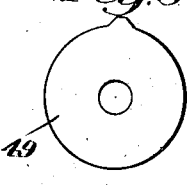

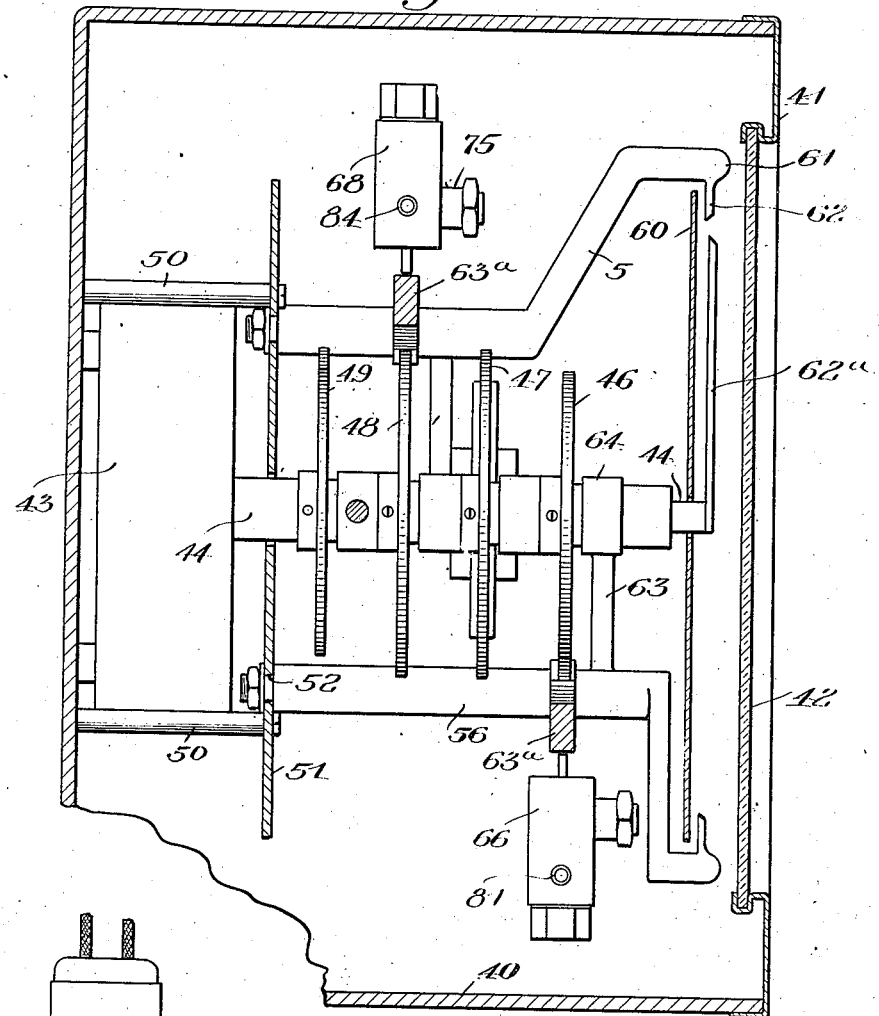

Patented May 31, 1927.

1,630,294

UNITED STATES PATENT OFFICE.

EDWARD B. FOOTE, OF ROCHESTER, NEW YORK, ASSIGNOR TO TAYLOR INSTRUMENT COMPANIES, OF ROCHESTER, NEW YORK, A CORPORATION OF NEW YORK.

PROCESS-CONTROL APPARATUS.

Application filed March 5, 1924. Serial No. 697,168.

This invention relates to automatic control apparatus and more particularly to apparatus for automatically controlling the operation of processing equipment, as by accomplishing a series of operating steps in timed sequence in accordance with a predetermined schedule, one object of the invention being to provide a practical and conveniently adaptable apparatus of the above character for automatically controlling the filling and emptying of a processing container, as well as the operating conditions such as the temperature therein, for carrying out a predetermined process.

Another object is the provision of such apparatus including means for governing the same conjointly by a timing mechanism and by a device responsive to the temperature or other container condition to be controlled. A further object is to afford apparatus of this character in which also the timing mechanism itself is governed by the operation of the temperature responsive device. Still a further object is to provide in such an apparatus a simple and practical form of construction operating in a reliable and accurate manner and capable of being conveniently adjusted to adapt the same to variously related operating steps of a process as well as to different processes.

To these and other ends the invention consists in certain improvements and combinations of parts, all as will be hereinafter more fully described, the novel features being pointed out in the claims at the end of the specification.

In the drawings:

Fig. 1 is a general view, partly diagrammatic, showing an application of an apparatus embodying the present invention;

Fig. 2 is an enlarged sectional elevation of a control mechanism shown generally in Fig. 1;

Figs. 3 to 6 inclusive are views of different cams employed in the mechanism shown in Fig. 2;

Fig. 7 is a sectional view substantially on the line 7ª—7ª in Fig. 2;

Fig. 8 is an enlarged sectional view of automatic switch means shown in Fig. 1, and Fig. 9 is an exterior elevation of a secondary valve means shown in Fig. 2.

Similar reference numerals throughout the several views indicate the same parts.

The embodiment of the invention herein disclosed by way of illustration shows an adaptation of the same to the automatic control of a processing container particularly adapted for freezing ice cream, although it will be apparent that the invention is applicable as well to the automatic control of other processes and equipment.

In the present instance the processing container 10, Fig. 1, is of a known variety employed for freezing ice cream, comprising an inlet pipe 11 controlled by a three-way valve 12 having connected therewith a pipe 13 leading to a suitable source of supply of the material to be processed or frozen. The other outlet of this valve communicates with a batch measure 14 of known construction for measuring a quantity of material for each operation of the container. Valve 12 is of the automatic variety and preferably of the known diaphragm type actuated in opposite directions by a spring 15 and fluid pressure supplied through a pipe line 16. These parts are so constructed and arranged, as will be readily understood by those familiar with this art, that application of air or other fluid pressure through pipe 16 positions the valve to close pipe 13 and open communication between batch measure 14 and the container to fill the same. Relief of pressure on the other hand, allows the valve to be moved by its spring 15 to position for closing pipe 11 and opening communication between the supply line 13 and the measure 14 to fill the latter.

Container 10 is also provided with an emptying or discharge valve in the present instance in the form of a door 17 sliding in vertical guides 18 over an outlet port at the bottom of the container. The raising and lowering of this door to open and close the outlet is automatically accomplished by a lever 19 pivoted thereto at 20 and itself pivotally supported at 21 on a bracket 22 fixed to the container and carrying also an actuating device 23 having a vertically sliding stem similar to that of the diaphragm valve already described, this stem being pivotally connected at 24 to the lever 19. The device 23 as indicated is operated to move its stem in opposite directions by a spring 25 and by a diaphragm actuated by pressure supplied through a pipe 26, the application of fluid pressure serving to lower valve 17 to closed position. The operating air lines 16 and 26 lead to a unitary timing and control mechanism indicated generally at 27 for controlling the same, as hereafter described.

The present process involves the control of temperature conditions within the container for which purpose the latter is equipped with suitable coil or jacket means, as well understood in the art supplied with a temperature controlling medium, such as brine, through a pipe line 28. At 29 is a return pipe for such medium and at 30 is a by-pass connection between the supply and return line. The valve 31, preferably of known three-way construction, serves to either close by-pass 30 and supply the controlling medium to the container to cool the same or to close communication between the container and supply line and connect the latter with by-pass 30 to terminate the cooling treatment. Valve 31 is preferably of the automatic spring and diaphragm variety already described and operates upon the application thereto of fluid pressure through the pipe 32 to transmit brine to the container, and on the other hand to by-pass the latter when the operating pressure in line 32 is relieved. Pipe line 32 also connects with and is controlled by the control mechanism 27.

As already stated, the apparatus controls not only the filling and emptying of the container but also its temperature, to which end there is provided a temperature responsive device of a well known variety of construction comprising a thermometer bulb 33 located in the container and connected by a tube 34 with a pressure responsive element 35, such as a Bourdon tube, the bulb and tube being, of course, filled with a fluid adapted to expand with increasing temperature and to thereby exert an internal pressure in the spiral tube 35 to move the free outer end of the latter, as well understood in the art. This end of element 35 carries a bridging contact 36 adapted to connect and disconnect switch contacts 37 controlling one side of an electrical supply line 38 connected with the control mechanism 27, for driving the latter as hereafter explained. Switch 37 is arranged in parallel with an automatic switch indicated generally at 88 and hereafter described, so that the switches conjointly control the supply of driving power to the control mechanism 27. It is apparent from the construction so far described that contact 36 is adapted to be moved by the responsive device 35 at a predetermined temperature into engagement with the contacts 37 to close the switch and to complete the circuit to the controller 27. By adjusting the relative positions of the device 35 and contacts 37 or in other known ways, the temperature at which the switch is closed may be closely predetermined and varied.

Control mechanism 27 preferably comprises the cylindrical casing 40 having its front closed by a door 41 including a glass window 42. Supported in any suitable manner on the rear wall of the casing is a driving motor device 43 preferably of the well known variety operated synchronously and uniformly by electrical power and serving as a timing mechanism or clock for rotating a spindle 44. This driving device is connected by conductors with binding posts 45, Fig. 1, to which the power line is connected.

Fixed on spindle 44 in longitudinally spaced relation are a plurality of disc cams, 46 to 49 inclusive, having the respective shapes shown in Figs. 3 to 6. Supported by posts 50 on the rear wall of the casing is a circular plate 51 formed with a circumferentially spaced series of arcuate slots 52 to 55 inclusive, corresponding to the number of cams. Slidably carried in any suitable manner at their rear ends in the slots are a series of supports, 56 to 59 inclusive, each of which is in the form substantially of a bar extending forwardly parallel with spindle 44 and turned angularly at its forward end to project adjacent the circumference of a dial 60. This end of each support is provided as at 61 with a portion adapted to be manually grasped for adjusting the support in its slot and circumferentially about spindle 44. Each support carries also a pointer 62 cooperating with graduations 63 on the dial in the present instance representing minutes of time. Each support is preferably steadied by an arm 63 fixed thereon and to a collar 64 rotatably carried on spindle 44 and it is apparent that these supports 56, 59 may each be adjusted circumferentially within the limits of its slot and about dial 60 to bring its pointer 62 into registry with different graduations thereon. The range of movement of any support may obviously have a length limited only by the arrangement and dimensions of the mechanism. Spindle 44 carries a pointer 62$^a$ cooperating with the dial graduations.

Pivotally mounted at one end in any suitable manner on each of the supports 56 to 59 is a follower 63$^a$, all of which in the present instance are alike, each being located on its support opposite one of the cams and provided with a spur 64$^a$ engaging the cam profile. As spindle 44 rotates therefore, each cam effects a pivotal swinging movement of its corresponding follower. Each follower engages at its outer side the stem 65 of a series of circumferentially arranged secondary valves 66 to 69 inclusive. These valves all have the same construction clearly shown in Fig. 2. Each comprises a block or casing formed with a seat 70 with which cooperates a valve 71 on the stem 65. A spring 72 tends to seat the valve which is opened by inward movement of the stem 65. Each valve block is formed with an inlet port 73 and an outlet port 74 communicating with the valve chamber on opposite sides of the seat. Each valve block includes also a nipple 75 fitted with a plug 76, Fig. 9, formed with a small vent opening 77 communicating with the valve chamber on the outlet side of the seat for relieving pressure after closing of the valve.

As shown in Fig. 2, the secondary air valves 66 to 69 inclusive are supported in circumferentially spaced arrangement, each opposite one of the followers 63ª and with its stem in contact with the latter. The valve springs tend to maintain the stems in contact with the followers and the latter in cooperation with the cams, although of course, additional spring means may be provided for holding the follower against the cam profile. These valves are connected with and control the various fluid pressure lines operating the processing equipment, as hereafter described.

Valve 69 is supplied with pressure through a pipe 78 adapted for connection with a suitable source of compressed air. The outlet of this valve is connected with a pipe 79 having several branches, one of which 80 is directly connected with the pipe 26 supplying the operating means of the container outlet valve 17. Another branch 81 supplies compressed air to valve 66 the outlet of which is connected by a pipe 82 with the pipe 16 leading to the container inlet valve 12. Still another branch 83 supplies air pressure to valve 68 the outlet of which is connected by a pipe 84 with the pipe 32 leading to the valve 31 controlling the supply of temperature regulating medium to the container. A branch 85 of the air supply pipe 78 supplies valve 67 the outlet of which is connected by a pipe 86 with a pipe 87 leading to fluid pressure means for operating switch 39 indicated generally at 88 and hereafter described.

The automatic switch 88 comprises preferably a plug 89, Fig. 8, having insulated switch contacts 90. The plug is screwed into a substantially cylindrical casing 91 in which slides a piston 92 carrying a contact part 93 adapted to connect the contacts 90. A spring 94 between the opposite end of the piston and the cylinder wall urges the piston to position for closing the switch, the cylinder however is provided with ports 95 and 96 on opposite sides of the piston, the former of which has the air supply pipe 87 connected thereto. Port 96 provides a relief vent as shown for the other end of the cylinder. When pressure is applied to pipe 87 the cylinder is moved to open the switch against the pressure of spring 94. When the air pressure is relieved in line 87, the spring closes the switch.

In operation, the spindle 44 of the control mechanism initially occupies a position in which its pointer 62ª is at zero and it has its cams so arranged that as pointer 62ª passes the zero position, the followers 63ª of cams 46, 47 and 48 are engaged and raised by high portions of these cams to open valves 66, 68 and 69, as shown in Fig. 2, while the low portion of the remaining cam 49 engages its follower so that the stem of valve 67 is not engaged and this valve remains closed. In this position of the parts compressed air is transmitted by valves 66, 68 and 69 to the container inlet valve 12, the brine control valve 31 and the container outlet valve 17. These main valves are thereby actuated to close the container outlet, connect the container inlet with batch measure 14 to fill the container, and to supply brine to cool the container, thus starting the process. As spindle 44 continues to revolve the low portion of cam 46 engages its follower 63ª, permitting valve 66 to close and relieve pressure in pipe 16, with the result that valve 12 closes communication between the container and the batch measure and connects the latter with pipe 13 to fill it preparatory to the next processing cycle.

Continued rotation of spindle 44 brings a high portion of cam 49 against its follower 63ª which later is moved against the spindle of valve 67 to unseat the same and transmit pressure to pipe 87 to open switch 88. This breaks the connection between the electrical supply line 38 and the timing and driving means 43 which latter thereupon temporarily comes to rest. During the foregoing portion of the process the supply of brine to the container continuously cools the latter and this supply of brine continues after the stopping of the timing mechanism as above described and until a predetermined temperature is reached at which point the responsive device 35 operates automatically to close switch 37 and thereby again connect the power line 38 with the timing means 43 to again start the rotation of spindle 44. Thereupon cam 49 allows valve 67 to close and close switch 88, and cam 48 allows valve 68 to close to actuate the main valve 31 to by-pass the brine. Spindle 44 continues to rotate for a period of time depending upon the adjusted spacing of the cam followers, during which time the temperature of the container, owing to the insulated construction of the same commonly employed, remains substantially constant for the desired period. Eventually a low portion of cam 47 permits its follower to drop, releasing the spindle of valve 69 which closes, relieving pressure in pipe 26 and effecting the opening of the container discharge valve 17. The processed material or ice cream is thereby discharged from the container, completing the processing cycle. Continued rotation of spindle 44 brings its cams again to position for opening valves 66, 68 and 69 to repeat the cycle as previously described above. The operation of the processing equipment is thus accomplished in a fully automatic manner accurately and adjustably controlled by adjustment of the cam followers as indicated by their pointers 62 on dial 60. It is obvious that a greater or less number of control devices, such as the respective cams and secondary valves may be employed and connected in various ways with automatic main valves either opened or closed by the application of fluid pressure, and that the invention is thus applicable to various processes and processing equipments.

I claim as my invention:

1. In apparatus of the character described, a container for material to be processed, means for discharging said material therefrom, conducting means for supplying a medium to said container for controlling the temperature of said material, a sensitive device subjected and responsive to the temperature in said container, control mechanism governed by said sensitive device and comprising rotary cam means, and operating connections actuated by said cam means for operating said discharge and supply means.

2. In apparatus of the character described, a container for material to be processed, means for filling said container with said material and for discharging the same therefrom, means for supplying a medium to said container for controlling the temperature of said material, a sensitive device subjected and responsive to the temperature in said container, and controlling mechanism governed by said device comprising rotary cam means and operating connections actuated thereby for operating said filling and discharge means and said supply means.

3. In apparatus of the character described, a container for material to be processed, means for filling said container with said material and for discharging the same therefrom, a sensitive device subjected and responsive to the temperature in said container, control mechanism governed by said device comprising rotary cam means, and operating connections actuated by said cam means for periodically operating said filling and discharge means.

4. In apparatus of the character described, a container for material to be processed, means for filling said container with said material and for discharging the same therefrom, means for supplying a medium to said container for controlling the temperature of said material, fluid pressure operated valves for operating said filling and discharge means, and said supply means, fluid pressure conducting means connected with said valves for operating the same and provided with auxiliary valves, a sensitive device subjected and responsive to the temperature in said container and control mechanism governed by said device comprising rotary cam means for actuating said auxiliary valves for operating said filling and discharge means, and said supply means.

5. In apparatus of the character described, a container for material to be processed, means for filling said container with said material and for discharging the same therefrom, means for supplying a medium to said container controlling the temperature of said material, fluid pressure operated valves for operating said filling and discharge means and said supply means, fluid pressure conducting means connected with said valves for operating the same and provided with auxiliary valves, a sensitive device subjected and responsive to the temperature in said container, control mechanism provided with means for starting the same and comprising rotary cam means for operating said auxiliary valves, and a connection between said sensitive device and said mechanism starting means for operating the latter at a predetermined temperature in said container.

6. In apparatus of the character described, a container for material to be processed, means for filling said container with said material and for discharging the same therefrom, means for supplying a medium to said container for controlling the temperature of said material, fluid pressure operated valves for operating said filling and discharge means and said supply means, fluid pressure conducting means connected with said valves for operating the same and provided with auxiliary valves, a sensitive device subjected and responsive to the temperature in said container, control mechanism governed by said device comprising a plurality of rotary actuating cams and motor means for rotating the same and followers for said cams arranged for actuating said auxiliary valves.

7. In apparatus of the character described, a container for material to be processed, means for discharging said material therefrom, means for supplying a temperature controlling medium to said container, a temperature responsive device subjected to the temperature of said container, control mechanism governed by said device comprising a plurality of cams, motor means for rotating said cams, and followers for said cams, said cams and followers being relatively adjustable along the paths of rotation of the cams, and operating connections between said followers and said discharge and supply means.

8. In apparatus of the character described, a processing container to be controlled, a batch measure, means connecting said measure and container for filling the latter, discharge means for said container, means for supplying a temperature controlling medium to said container, fluid pressure operated valves controlling said filling, discharge and supply means, fluid pressure conducting means connected with said valves and provided with auxiliary valves, a temperature responsive device subjected to the temperature of said container, control mechanism comprising a shaft provided with a plurality of cams, followers for said cams, said followers and cams being relatively adjustable along the paths of the cams, motor means for rotating said shaft, a device for starting and stopping said motor means controlled conjointly by said responsive device and one of said cam followers, and operating connections between the others of said followers and said auxiliary valves.

9. In apparatus of the character described, control mechanism comprising a shaft, cams on said shaft, valves disposed about said shaft, followers disposed about said shaft for cooperation with respective ones of said cams and valves, said followers and cams being adjustable along the paths of said cams, motor means for rotating said shaft, a dial, and indicators connected with said shaft and followers for cooperation with said dial.

10. In apparatus of the character described, control mechanism comprising a shaft, cams on said shaft, valves disposed about said shaft, spaced supports adjustably mounted about said shaft as a center, followers on said supports cooperating with respective ones of said cams and valves, motor means for rotating said shaft, a dial, a pointer on said shaft indicating on said dial, and members carried by said supports for adjusting the same provided with pointers indicating the positions thereof on said dial.

11. In apparatus of the character described, control mechanism comprising a shaft, cams on said shaft, control devices actuated by said cams, a sensitive device responsive to a condition to be controlled, motor means for rotating said shaft provided with means for starting and stopping the same, and operating means connecting said sensitive device and one of said control devices with said starting and stopping means for conjointly controlling the latter.

12. In apparatus of the character described, control mechanism comprising a plurality of fluid pressure control valves, motor means for driving said mechanism and operating said valves provided with means for starting and stopping the same, a sensitive device responsive to a condition to be controlled, and means connecting said sensitive device and one of said valves with said starting and stopping means for conjointly controlling the latter.

EDWARD B. FOOTE.